United States Patent [19]

Seto

[11] Patent Number: 4,946,233
[45] Date of Patent: Aug. 7, 1990

[54] LIGHT SCANNING APPARATUS
[75] Inventor: Fumiaki Seto, Yokohama, Japan
[73] Assignee: Fujitsu Limited, Kawasaki, Japan
[21] Appl. No.: 473,113
[22] Filed: Jan. 31, 1990

Related U.S. Application Data
[63] Continuation of Ser. No. 207,629, Jun. 16, 1988, abandoned.

[30] Foreign Application Priority Data
Jun. 19, 1987 [JP] Japan .................. 62-154021

[51] Int. Cl.⁵ .................. G02B 26/08; G02B 17/00; G02F 1/33; G01D 15/06
[52] U.S. Cl. .................. 350/6.5; 350/6.7; 350/6.91; 350/258; 358/201; 358/199; 358/206; 358/474; 346/160
[58] Field of Search ............... 350/358, 6.5, 6.7, 6.91; 358/206, 201, 199, 285; 346/160

[56] References Cited
U.S. PATENT DOCUMENTS
3,984,171 10/1976 Hotchkiss .................. 350/6.7
4,170,028 10/1979 DeBenedictis et al. .......... 250/236

Primary Examiner—Eugene R. Laroche
Assistant Examiner—Michael R. Shingleton
Attorney, Agent, or Firm—Staas & Halsey

[57] ABSTRACT

In a light scanning apparatus, such as in a laser printer, an optical switch is provided between a light source and an acousto-optic light-modulating element for modulating the light according to data to be printed. The optical switch may be an acousto-optic light-modulating element as well. The optical switch blocks or passes the continuously input light from the light source according to a predetermined schedule, such as eight bits prior to the start of black dots and eight bits after the end of the block dots, or during a stand-by period. The time during which a fine light spot is focused on the acousto-optic light-modulating element is thus shortened. Accordingly, the life of the acousto-optic light-modulating element is increased because of the shortened duration of the focusing of the input light. Achievement of the fine spot size allows finer print-out resolution without sacrificing scan speed or the life of the element. The light spot focused on the optical switch is broad enough in size for the element to obtain to also achieve a long life.

15 Claims, 8 Drawing Sheets

LIGHT SCANNING APPARATUS

BACKGROUND OF THE INVENTION

1. Field of the Invention

The present invention relates to a light scanning apparatus for reading or developing an image, and more particularly to a light scanning apparatus in which a light source of the light scanning apparatus is continuously lit during operation of the apparatus.

2. Description of the Related Art

As is well known, when an ultrasonic wave of a particular frequency is applied to an acousto-optic modulating element, light input thereto in a specific direction with respect to the propagation direction of the ultrasonic wave is deflected, due to an effect called Bragg Reflection. Thus, in a high speed printer employing a gas laser as its light source, for example, an acousto-optic modulating element has been employed to modulate, i.e. switch, the continuously output laser light. Light emitting diodes (LEDs), which can be directly modulated, have also been employed as a light source for high speed printers. However, it is difficult to match the light spectrum of LEDs with that of a photosensitive drum of the printer and LEDs have a relatively short life. Gas lasers are therefore still employed as light sources.

A block diagram of a prior art laser printer system using an acousto-optic light-modulating element is shown in FIG. 1. A laser light produced by a light source 1 (e.g., gas laser) is focused by a focusing lens system 2 onto a crystal of an acousto-optic light-modulating element 4 to form a fine light spot thereon. On receiving an enabling signal from a control circuit 10, a modulator driver 3 outputs a modulating signal of approximately 200 MHz to the acousto-optic light-modulating element 4. The acousto-optic light-modulating element 4 deflects the light input thereto by an angle of 23 m radians, through a slit 20 in a plate 19 and onto an expander lens system 5.

When no modulating signal is applied to the acousto-optic light-modulating element 4 from the modulator driver 3, the acousto-optic light-modulating element 4 does not deflect the light through slit 20. Instead, the light is blocked by plate 19 and thus the light from the focusing system 2 never reaches the expanding lens system 5.

In FIG. 1, the deflected light is designated by arrow D and the not-deflected light is designated by arrow ND. The deflected light D reaches the expanding lens 5 through slit 20; however, the not-deflected light ND is directed onto the plate 19 and is blocked from reaching expander lens system 5.

The deflected light D reaching the expander lens system 5 is expanded to form a parallel light beam which is directed to rotating polygonal mirrors 6. Before reaching a photosensitive drum 8, the light is deflected by the rotating polygonal mirrors 6 so as to scan the beam detector 9. The light deflected by the mirrors 6 is focused by an f.θ lens 7. The lens 7 directs a finely focused light spot onto the photosensitive drum 8. Beam detector 9 located optically next to the photo-sensitive drum 8 detects the light scanning a single frame (i.e., a single light scan from one end of drum 8 to the other end of drum 8) on the drum 8, prior to the scanning light beginning to actually scan drum 8. Upon detecting the light, the beam detector 9 transmits a detection signal BD (beam detection) to control circuit 10. In response to receiving the detection signal BD, the control circuit 10 allows a VIDEO signal to be transmitted sequentially to the modulator driver 3. The VIDEO signal acts as a modulator driver signal. When the signal is a "1" level, the modulator driver 3 causes the acousto-optic modulating element 4 to deflect the input light through the slit 20.

Referring to FIGS. 2 and 3, the structure and operation of the acousto-optic light-modulating element 4 are explained below. FIG. 2 schematically illustrates the structure of the acousto-optic light-modulating element 4. The acousto-optic light-modulating element 4 includes a crystal portion 4' comprising, for example, lead molybdate ($PbMoO_4$) or tellurium dioxide ($TeO_2$) and an electro-acoustic transducer 4" comprising, for example, lithium niobate ($LiNbO_3$). FIG. 3 illustrates waveforms of the modulating signal "a" provided by the modulator driver 3 and the deflected light "c" output from the acousto-optic light-modulating element 4. When no modulating signal "a" is applied to the transducer 4", the laser light beam "b" travels straight through the crystal portion 4' of the element 4 and is output as shown by dotted lines L5 and L6. When a modulating signal "a" is applied to the transducer 4", an ultrasonic wave L7 of approximately 200 MHz generated therein propagates through the element 4 approximately orthogonal to the direction of the input light beam "b". As soon as the front end of the ultrasonic wave reaches the upper edge L1 of the input light beam "b", the upper edge of the light is deflected along line L3 in the direction "c". It takes a time period $t_r$ (FIG. 3) for the ultrasonic wave L7 to reach the lower edge L2. Therefore, the rise and fall of the waveform of the deflected light pulse, i.e., the output of the acousto-optic light-modulating element 4 is delayed and deformed as shown by "c" in FIG. 3. The delay time period, i.e., the rise time period $t_r$ is determined by:

$$t_r = 0.66 d/v$$

where d is the diameter of the input light beam "b", and v is the propagation velocity of the ultrasonic wave L7 in the crystal portion 4' of the acousto-optic modulating element.

In order to achieve a less deformed modulated light output, i.e. one having fast rising and falling edges, the diameter of the light spot is required to be as small as possible. This is because the delay time period $t_r$ is shorter for a smaller diameter d of the input light beam b. If the light output pulse is deformed, a dot to be printed may be missed. The recent trend for speeding up the light scanning apparatus and achieving higher resolution requires that the light spot size be reduced from about 100 μm in diameter, to as fine as 30 μm. The smaller spot size means that there is a larger energy density of the focused light; the energy density varies inversely with the square of the spot diameter. However, the allowable light input to the acousto-optic light-modulating element is limited by the energy density of the light input thereto as well as by the accumulated duration of the light input. As a solution to this problem, a mechanical shutter may be provided between the light focusing system 2 and the acousto-optic light-modulating element 4; however, the shutter speed is too slow and the durability of the shutter is too short to be efficient. Moreover, a solenoid used to drive the mechanical shutter generates electrical noise which disturbs electronic circuits in the vicinity of the solenoid.

SUMMARY OF THE INVENTION

It is an object of the invention to provide a high speed, high resolution, light scanning apparatus employing a long-life acousto-optic light-modulating element and a gas laser as a light source.

It is another object of the invention to provide a high speed, high resolution light scanning apparatus which narrows the focus of a light beam from a light source when a narrowly focused light beam is needed for imaging. According to the present invention, there is provided a light scanning apparatus operatively connectable to receive light and image data, comprising first optical switch means for optically passing the light in accordance with a first control signal; focusing means, operatively connected to the first optical switch means, for focusing the light passed by the first optical switch means; and second optical switch means, operatively connected to the focusing means for optically passing, in accordance with a second control signal, the light focused by the focusing means.

The above-mentioned features and advantages of the present invention, together with other objects and advantages, which will become apparent, and will be more fully described hereinafter, with reference being made to the accompanying drawings which form a part hereof, wherein like numerals refer to like parts throughout.

DESCRIPTION OF THE PREFERRED EMBODIMENTS

Figure 1:
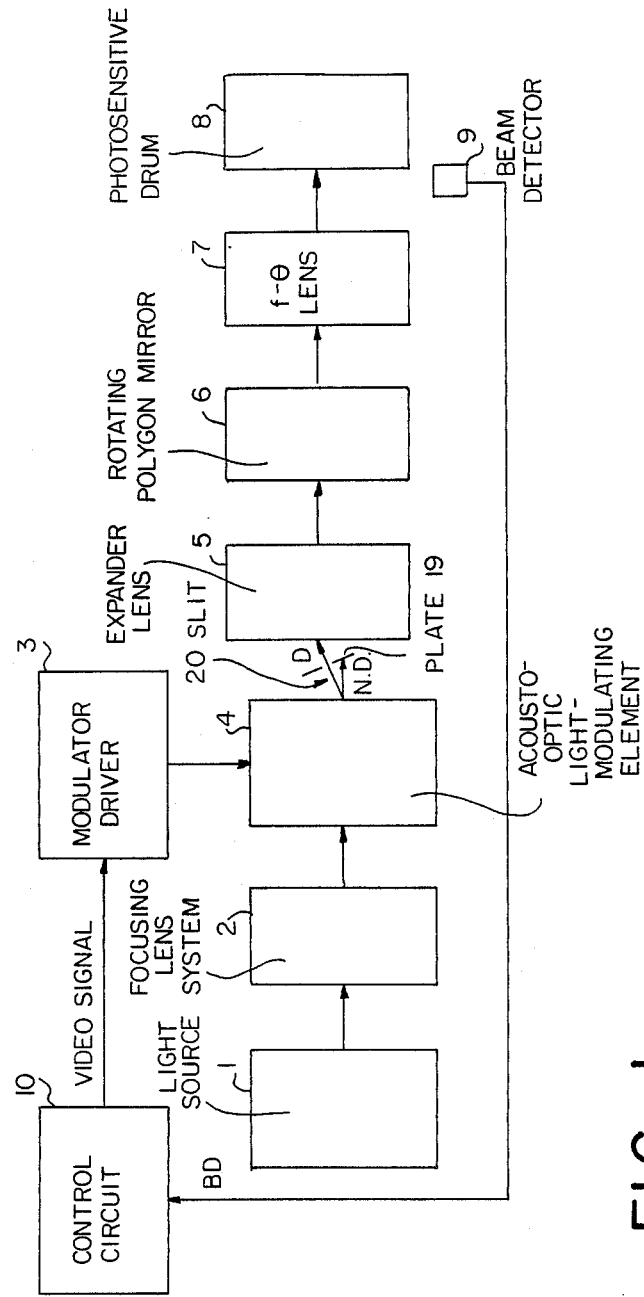
FIG. 1 is a block diagram of a prior art laser printer system using an acousto-optic modulating element.
Figure 2:
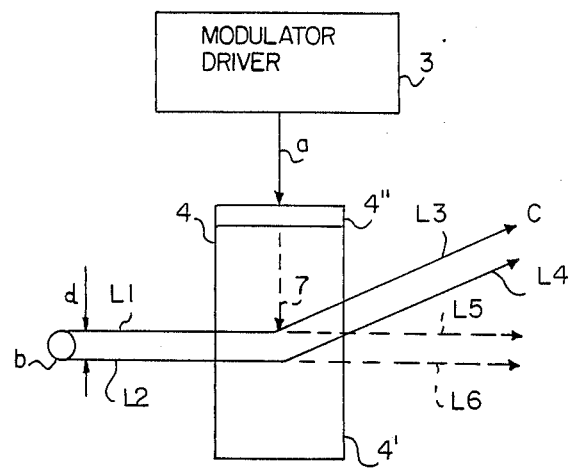
FIG. 2 schematically illustrates the structure of the acousto-optic modulating element of FIG. 1.
Figure 3:
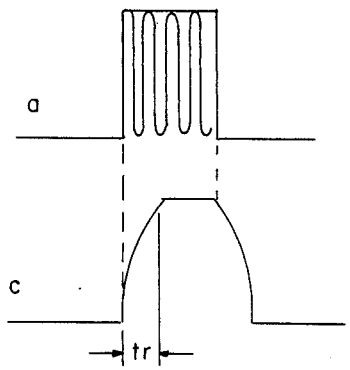
FIG. 3 shows waveforms of the input modulating signal and the output light in the FIG. 2 structure.
Figure 4:
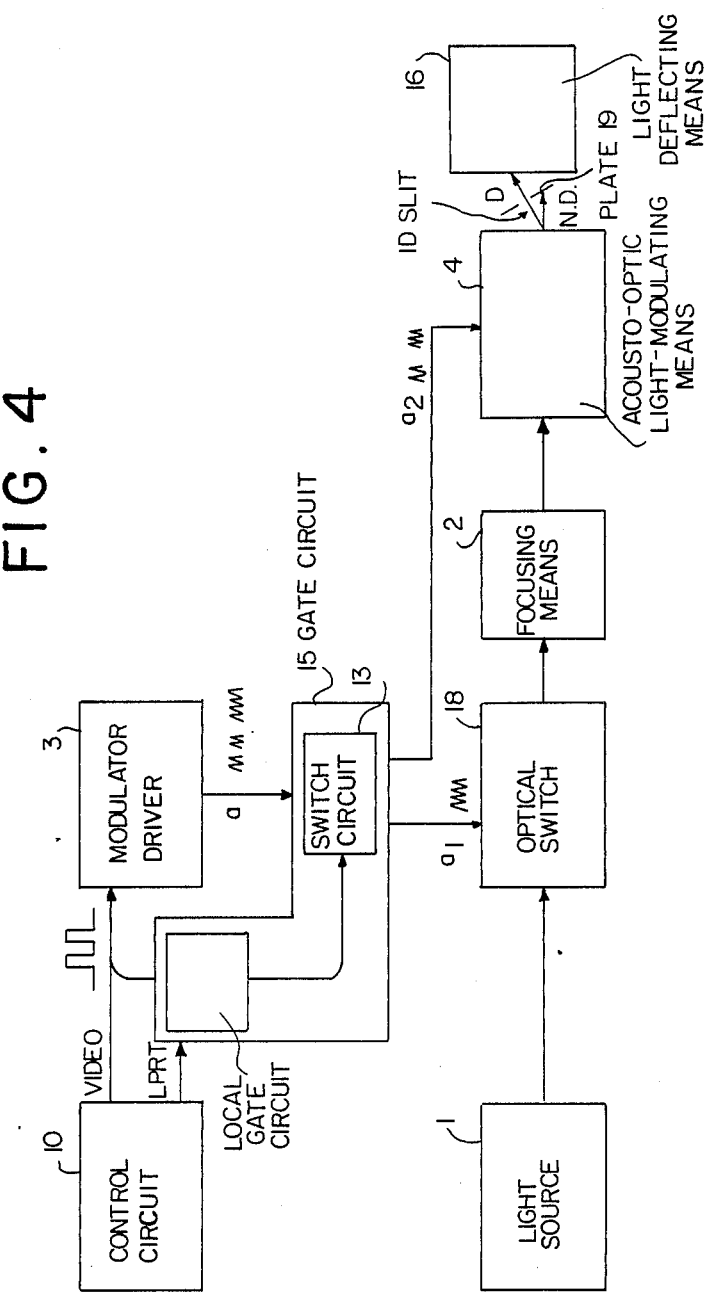
FIG. 4 is a block diagram of a system embodying the present invention.

FIG. 4 is a block diagram of a system embodying the present invention. In FIG. 4, an optical switch 18 (which may be an acousto-optic light-modulating element) is provided between a light source 1 and a light focusing means 2. A gate circuit 15 provides a control signal "$a_1$" to control the optical switch 18. The switch 18 optically passes to or blocks the light input from light source 1 in accordance with the control signal. The control is also in accordance with a pre-programmed schedule, and depends on the length of blank video signals continuously being input for printing or display. In FIG. 4, gate circuit 15 and control circuit 10 comprise a control circuit means for providing control signals to the optical switch 18 and the acousto-optic light-modulating means 4. With the present invention, the light density of the light spot projected onto acousto-optic light-modulating element 4 is increased. However, the duration of the light spot projected onto the acousto-optic light-modulating element 4 is reduced, resulting in increased life of the acousto-optic light-modulating element 4. Thus, the reduced light spot size increases the output resolution; e.g., the resolution of a print-out without sacrificing the working life of an acousto-optic light modulating element such as element 4. The light density of the light spot projected onto the optical switch 18 is low enough to allow a long working-life for optical switch 18 even though light is continuously applied thereto.

Figure 5:
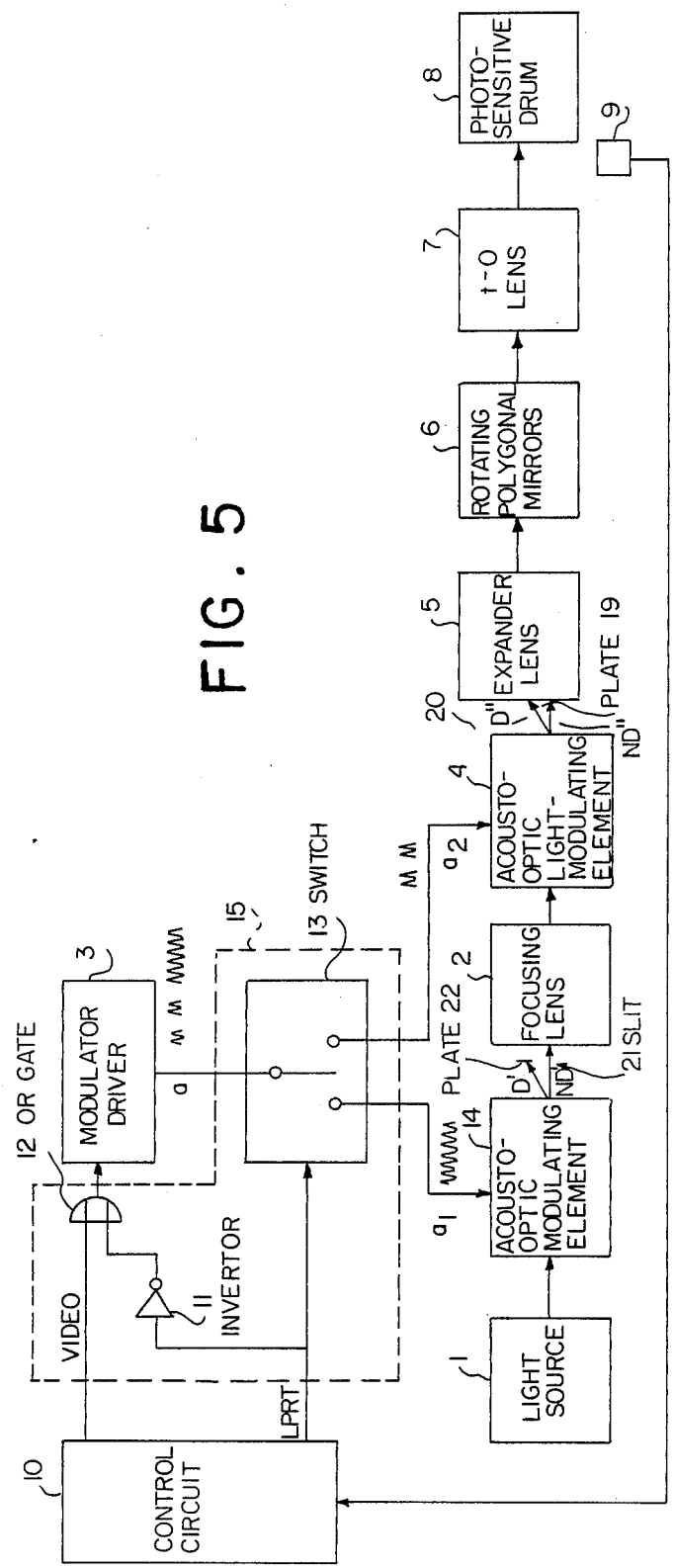
FIG. 5 is a block diagram of a laser printer embodying the present invention.
Figure 6:
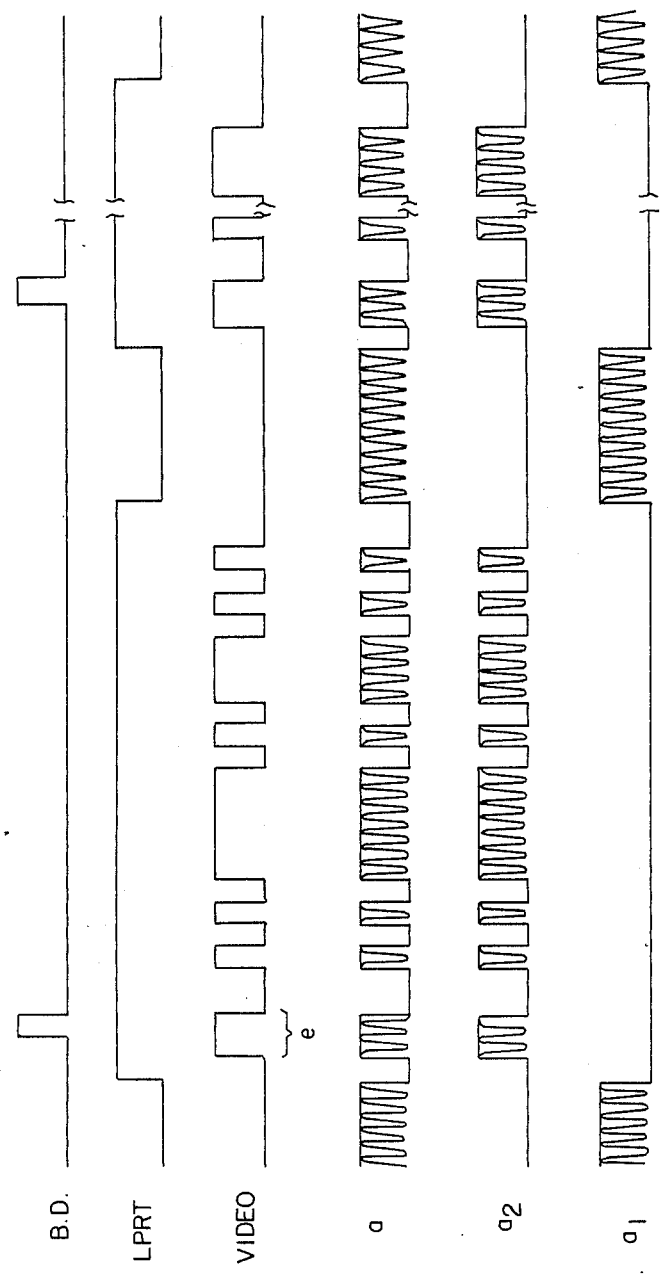
FIG. 6 is a timing diagram for signal pulses in the FIG. 5 embodiment.

A block diagram of a laser printer embodying the present invention is shown in FIG. 5. Waveforms of the signals in FIG. 5 are shown in FIG. 6. A light source 1 can be a gas laser (for example, an argon ($Ar^+$), helium-neon (HeNe) or helium-cadmium (HeCd) gas laser). The light beam output from the light source 1 is continuously applied to a first acousto-optic light-modulating element 14. The light beam is not finely focused (a beam of approximately 600 $\mu$m in diameter).

As is well known, prior to reflecting light by the rotating polygonal mirror 6 to scan a photo-sensitive drum 8, an enabling portion of a VIDEO signal (discussed below) enables the light to be deflected to first scan beam detector 9 located optically next (typically just before) the photosensitive drum 8. Upon detecting light, the beam detector 9 outputs a detection signal BD. This signal indicates that the light is to begin scanning a single frame on the drum 8. In the control circuit 10, the BD signal enables VIDEO signals (e.g., image data) to be output to the modulator driver 3 through an OR gate 12, which comprises a local gate circuit together with an inverter 11. Details and varieties of the programming to control the printer signal LPRT are described below.

The VIDEO signal is typically a sequence of pulses, each having approximately a 28.5 ns width for single dot printing. The enabling portion e of the VIDEO signal shown in FIG. 6 is of a duration which is just long enough to be detected by beam detector 9. The VIDEO signal enables the modulator driver 3 to output an approximately 200 MHz modulating signal "a" when the VIDEO signal is, for example, a logic 1 as shown in FIG. 6. A switch circuit 13 is arranged so as to deliver the modulating signal "a" to the acousto-optic light-modulating element 4 as the signal (i.e., a control signal) "$a_2$38 when the switch 13 receives a logic "1" level of the print signal LPRT. No modulating signal is delivered to the first acousto-optic light-modulating element 14 during this time.

When receiving no modulating signal, the first acousto-optic light-modulating element 14 allows the light input from the light source 1 to pass through slit 21 of plate 22, without being deflected. This light, indicated by the arrow ND', is applied to a focusing lens system 2. The light input to the focusing lens system 2 is focused onto the second acousto-optic light-modulating element 4 to form a light spot as fine as 30 $\mu$m. When receiving the modulating signal "$a_2$", the second acousto-optic light modulating element 4 deflects the input light from the focusing lens system 2 as indicated by the arrow D". The deflected light D", i.e. modulated or optically passed light, passes through slit 20 of plate 19 to an expander lens 5.

When no modulating signal is applied to the second acousto-optic light-modulating element 4, the light input to the second acousto-optic light-modulating element 4 passes straight through it without being deflected (as indicated by the arrow ND") onto plate 19; in other words, the light ND" is blocked.

Figure 8:
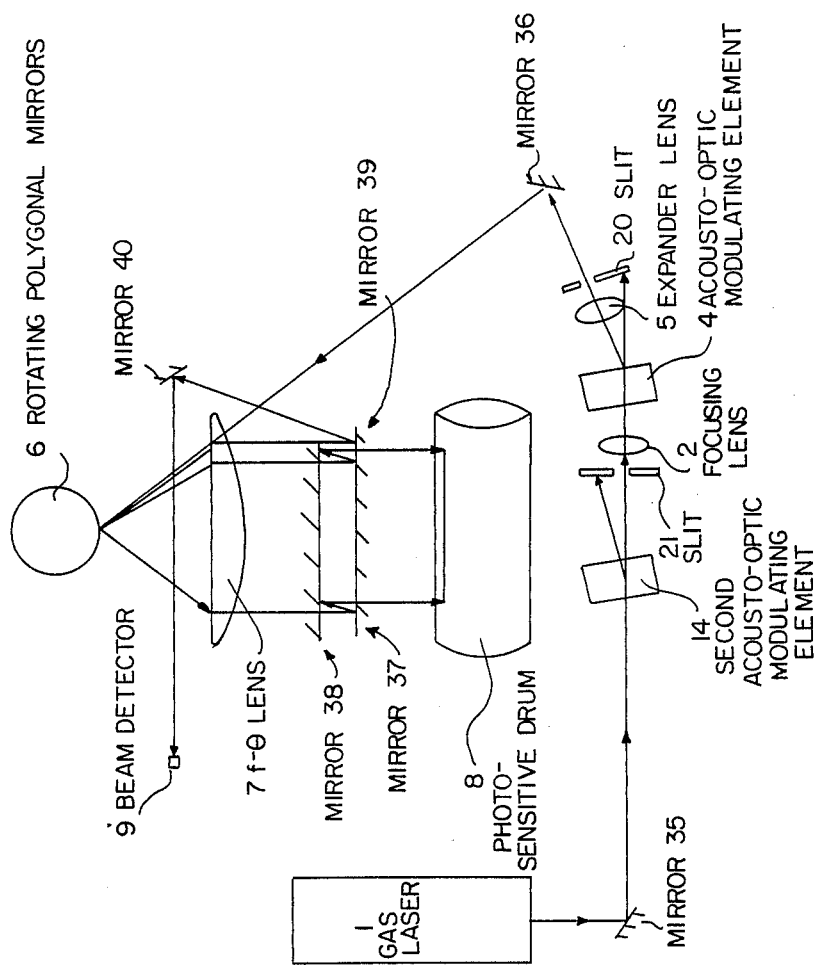
FIG. 8 schematically illustrates the light paths in the FIG. 7 embodiment.

The light input to the expander lens 5 is expanded to form a parallel beam and is projected on to the rotating polygonal mirrors 6. The light beam projected onto the polygonal mirrors 6 is reflected to scan the f.θlens 7. The light beam input onto the polygonal mirrors 6 is uniformly focused onto a photo-sensitive drum 8, generally formed of an alloy of selenium (Se) and tellurium (Te), and the focused light spot scans along a line of the photo-sensitive drum 8 as shown in FIG. 8. This produces an electrostatic latent image on the drum 8, in accordance with the input video signals.

When a "0" level of the print signal LPRT is inverted by the inverter 11 to enable the modulator driver 3 via the OR gate 12, switch circuit 13 delivers the modulation signal "a" from the modulator driver 3 to the first acousto-optic light-modulating element 14 as the modulating signal "$a_1$" without delivering a modulating signal "$a_2$" to the acousto-optic light modulating element 4. On receiving the modulation signal "$a_1$," the first acousto-optic light-modulating element 14 deflects the light applied thereto by an angle of approximately 23 m radian as indicated by the arrow D'. The deflected light D' is directed onto plate 22 so as to block the light D". Accordingly, no light is input to the second acousto-optic light-modulating element 4.

The duration of the "0" level of the print signal LPRT may be programmed as desired. For example, the duration may equal the stand-by or waiting period before the start of a printing operation; the fly-back period; or a period during which blank signals, i.e. a "0" level of the video signals continues for more than eight bits. In other words, the print signal LPRT becomes a "1" level eight bits prior to the start of VIDEO signals of a level "1". The print signal LPRT becomes a "0" level eight bits after the end of VIDEO signals of a level "1". This number (eight bits) is chosen to meet the slow rise and fall time of the acousto-optic light-modulating modulating element 14 that has a large spot size applied thereto. The print signal LPRT, as well as the VIDEO signal, can also be made "1" as a routine by a timer which measures the time elapsing after the previous frame and indicates the timing that the circuit must be ready to start scanning a new frame, i.e. so that the paths are open for the light to reach the beam detector 9.

Figure 7:
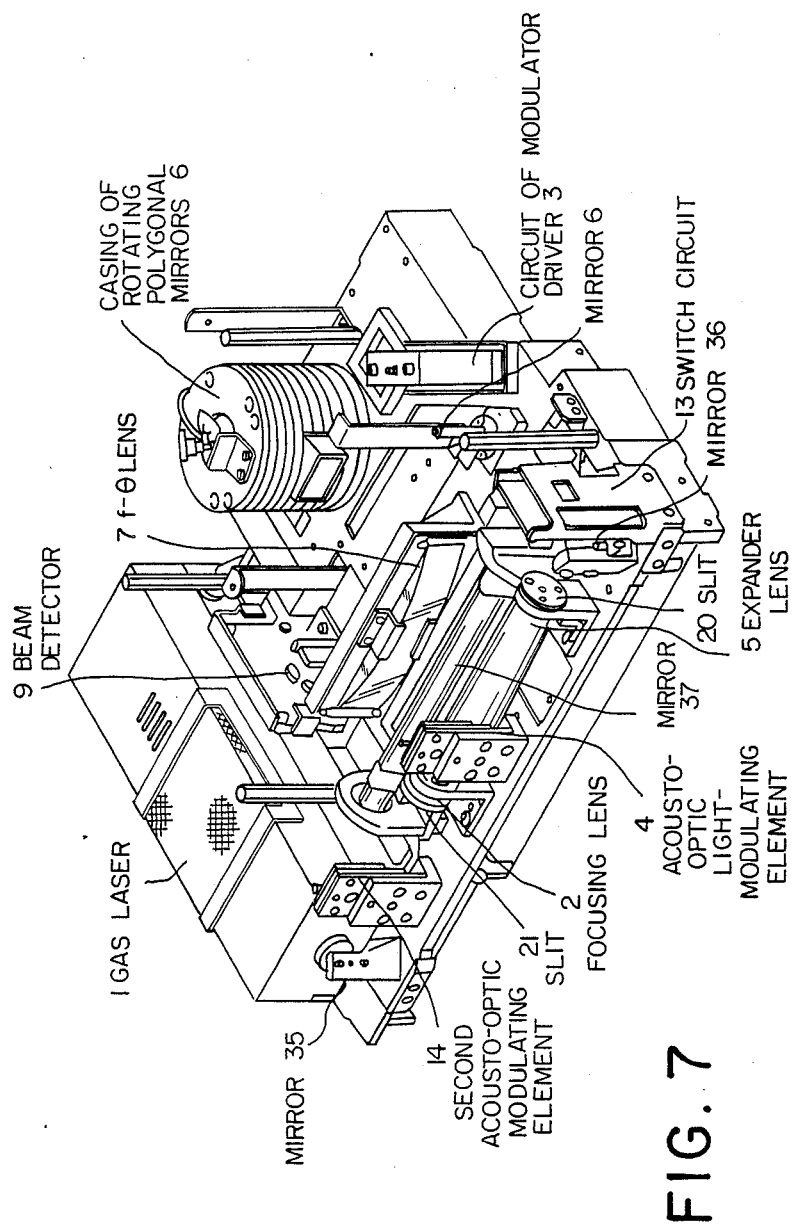
FIG. 7 is a perspective view of a laser printer embodying the present invention.

FIGS. 7 and 8 show a perspective view and a schematic drawing, respectively, of the present invention used in a laser printer application. The light paths in FIG. 7 are schematically illustrated in FIG. 8. In the strict sense of the word, the light input to the acousto-optic light-modulating elements is slanted for a predetermined degree as shown in FIG. 7. Mirrors 36–40 reflect the various light beams to allow the components of the laser printer to be compactly packaged. For simplifying the explanation, the location of plate 19 and slit 20 in FIG. 4 and 5 is drawn just after the second acousto-optic light-modulating element 4, though in FIG. 7 and 8 it is located after the expander lens 5.

Figure 9:
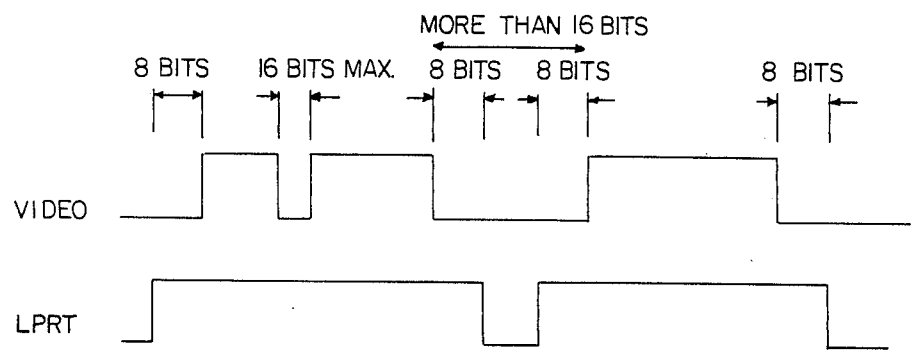
FIG. 9 is a graph of a print signal and video signal pulses according to the present invention.
Figure 10:
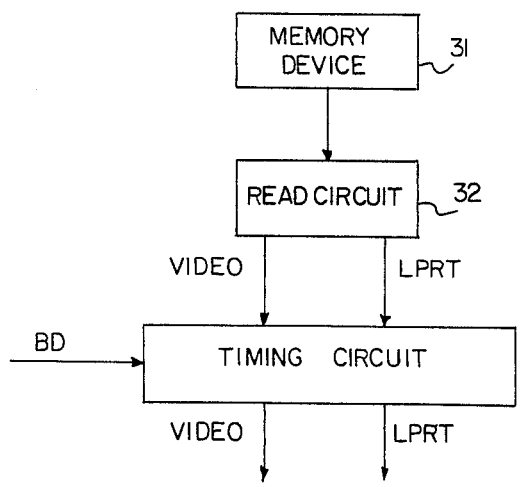
FIG. 10 is a block diagram of a circuit for producing programmed print signals.

For the case where the print signal LPRT is programmed depending on the VIDEO signals, the circuit shown in FIG. 10 is additionally included in the control circuit 10. A graph of the print signal LPRT compared to the VIDEO signal pulses of the present invention is shown in FIG. 9. The data to be printed is stored in a memory device 31, typically a semiconductor RAM (random access memory). The print data (VIDEO signals) for a single frame is read out by a read circuit 32 from the memory device 31. The read circuit 32 also checks the logic level of the data (VIDEO signals) sequentially in eight-bit advance. When all of the eight bits in advance are a "0" level, the print signal LPRT becomes "0", as shown in FIG. 9. When a "1" level of the data (the VIDEO signal) is read out in eight-bit advance, the print signal LPRT becomes "1". Furthermore, the read circuit 32 counts continuous "0" VIDEO signal bits currently printed. When it counts eight, the print signal LPRT becomes "0".

Supposing that the scan width of the light is 16 inches, and the length of a printed line of characters is 15 inches wide and 8 inches wide, respectively. The blank area at both sides total 7% and 50% of the scan width, respectively. Even for the 15 inch width, considering the line spaces, the black portion, i.e. portion to be printed, is as low as several percent of the entire light scanning.

Consequently, the duration of the light input to the second acousto-optic light-modulating element 4 can be reduced to several percent since there is no need for input light to the second acousto-optic light-modulating element unless printing is occurring on the paper. This means that the life of the acousto-optic light-modulating element 4 is extended more than ten times that of the prior art systems. This compensates for the shortened life caused by the increased light energy density needed for reducing the spot size focused on the prior art acousto-optic light-modulating element. The light beam input to the first acousto-optic light-modulating element 14 is broad, i.e. the light energy density is sufficiently low for the element so that it does not have a shortened life, even though the light is always input thereto.

The achievement of the 30 μm diameter spot projected on the second acousto-optic light-modulating element 4 without sacrificing its working life accomplishes printing resolution as much as 2.6 times better than that of the prior art 100 μm diameter spot, without sacrificing scan speed.

Switching of the first acousto-optic light-modulating element 14 is not required to be as fast as that of the second acousto-optic light-modulating element 4; therefore, the first acousto-optic light-modulating element 14 can be of lower specification level, i.e. of a lower cost, as long as the same modulation frequency is useable.

The location of the slits 20 and 21 in the figures are only for example; therefore, the slits may be located at places other than those above-described, or may be omitted, as long as the function of the optical switch is fully performed.

Though in the description of the preferred embodiment the first acousto-optic light-modulating element 14 is on before and off after eight continuous bits of blank signals, this bit number may be chosen other than eight as long as the response of the first acousto-optic light-modulating element 14 does not disturb the switching of the second acousto-optic light-modulating element 4.

Though the essentially same kind of acousto-optic light-modulating element is used for both acousto-optic light-modulating elements 4 and 14 and both of them are driven by the same modulator driver, a different kind of optical switch, such as a liquid crystal switch, may be used, driven by an independent driver, in place of the first acousto-optic light-modulating element 14.

Though in the above-described preferred embodiments, polygonal mirrors are employed for scanning the light, it is apparent that other types of scanning devices, such as galvano mirrors or holograms, may also be employed.

Though only a laser printer is referred to in the above-description as a preferred embodiment, the light scanning apparatus of the present invention may be applied to an apparatus for writing data on photo film, or to an optical character/image reader, or to a display device of a high-resolution television receiver. In other words, though the light switched by the second acousto-optic light-modulating element 4 scans a light-sensitive drum 8, this light-sensitive drum 8 may be replaced by a photo micro film on which an image or character is to be recorded, or a character or an image which is to be optically read out, or an optical system which projects the scanned light on to a screen such as a television screen. When this light scanning apparatus is used for a character/image reader or television projection, the light must be scanned not only along the horizontal direction (as along the ridgeline of the light-sensitive drum) but also along the vertical direction by the rotating polygonal mirrors, or the character/image to be read out is fed vertically.

The many features and advantages of the invention are apparent from the detailed specification and thus, it is intended by the appended claims to cover all such features and advantages of the system which fall within the true spirit and scope of the invention. Further, numerous modifications and changes may readily occur to those skilled in the art. It is not desired to limit the invention to the exact construction and operation shown and described, and accordingly, all suitable modifications and equivalents may be resorted to, falling within the scope of the invention.

What is claimed is:

1. A light scanning apparatus comprising:
   light means for emitting a low energy density light beam;
   electronically controlled optical switch means, positioned to have said light beam incident thereon, for outputting a switched light beam at specified output angles determined in accordance with a first control signal;
   focusing means, positioned to have said switched light beam at one of said specified output angles incided thereon, for focusing said incident switched light beam and for outputting a finely focused light spot;
   first acousto-optic light-modulating means, positioned to have said finely focused light spot incident thereon, for outputting a modulated light spot at predetermined output angles determined in accordance with a video signal;
   modulator driver means for providing said video signal to said first acousto-optic light-modulating means; and
   circuit means for providing said first control signal so that said switched light beam at one of said specified output angles is incident on said focusing means for limited time periods.

2. A light scanning apparatus as recited in claim 1, wherein said optical switch means comprises another acousto-optic light-modulating means.

3. A light scanning apparatus as recited in claim 2, wherein said another acousto-optic light-modulating means has a structure that is substantially identical to that of said first acousto-optic light-modulating means.

4. A light scanning apparatus as recited in claim 3, wherein said circuit means includes:
   switch circuit means, operatively connected to said modulator driver means, for selectively providing said first control signal and said video signal to said first acousto-optic light-modulating means and said another acousto-optic light modulating means; and
   local circuit means, operatively connected to said switch circuit means, for controlling said switch circuit means, and for enabling said modulator driver means, so that said first acousto-optic light modulating means provides said modulated light spot at a desired output angle while said another acousto-optic light-modulating means provides said switched light beam to said focusing means.

5. A light scanning apparatus as recited in claim 1, wherein said apparatus has a standby state and said circuit means includes means for providing said first control signal so that said switched light beam at one of said specified angles is not incident on said focusing means during the time that the light scanning apparatus is in the stand-by state and while said light means is emitting said light beam.

6. A light scanning apparatus as recited in claim 11, wherein said circuit means includes means for providing said first control signal so that said switched light beam at one of said specified angles is incident on said focusing means a first predetermined time prior to said video signal to reproduce dots and is not incident on said focusing means a second predetermined time after said video signal.

7. A light scanning apparatus as recited in claim 1, further comprising:
   light reflecting means, having rotating polygonal mirrors, for reflecting said modulated light spot.

8. A light scanning apparatus as recited in claim 1, further comprising:
   light reflecting means, having a galvano mirror, for reflecting said modulated light spot.

9. A light scanning apparatus as recited in claim 8, further comprising:
   a light-sensitive drum having a ridgeline on which said reflected light is uniformly focused.

10. A light scanning apparatus comprising:
    light means for emitting a light beam;
    electronically controlled optical switch means, positioned to have said light beam incident thereon, for outputting a switched light beam at specified output angles determined in accordance with a first control signal;
    focusing means, positioned to have said switched light beam at one of said specified output angles incided thereon, for focusing said incident light beam and for outputting a finely focused light spot;
    acousto-optic light-modulating means, positioned to have said finely focused light spot incident thereon, for receiving said finely focused light spot and for switching the received finely focused light spot in accordance with a video signal;
    light-sensitive means for producing an electrostatic image in accordance with light passing through said acousto-optic light-modulating means; and
    circuit means for providing said first control signal so that said switched light beam at one of said specified output angles is incident on said focusing means for limited time periods.

11. A light scanning apparatus as recited in claim 10, wherein said optical switch means comprises another acousto-optic light modulating means.

12. A light scanning apparatus as recited in claim 11, wherein said another acousto-optic light modulating means comprises a device having a structure corresponding to that of said acousto-optic light modulating means.

13. A light scanning apparatus as recited in claim 12, wherein said circuit means includes:

switch circuit means, for selectively providing said first control signal and said video signal to said acousto-optic light modulating means and said another acousto-optic light modulating means; and local circuit means for controlling said switch circuit means and for enabling said modulator driver so that said acousto-optic light modulating means outputs said finely focused light spot incident thereon at a desired output angle while said another acousto-optic light modulating means outputs said switched light beam to said focusing means.

14. A light scanning apparatus as recited in claim 13, wherein said apparatus has a standby status and said circuit means includes means for providing said first control signal so that said switched light beam at one of said specified angles is not incident on said focusing means during a time when said light scanning apparatus is in the stand-by state and while said light source means is emitting said light beam.

15. A light scanning apparatus as recited in claim 10, wherein said gate circuit means includes means for providing said first control signal so that said switched light beam at one of said specified angles is incident on said focusing means a first predetermined time prior to said video signal to reproduce dots and is not incident on said focusing means a second predetermined time after said video signal.

* * * * *